United States Patent [19]

Fenner

[11] 4,174,939
[45] Nov. 20, 1979

[54] LATCH FOR THREE-PART MOLD

[75] Inventor: Klaus-Bernd Fenner, Lüdenscheid, Fed. Rep. of Germany

[73] Assignee: Hasco-Normalien Hasenclever & Co., Lüdenscheid, Fed. Rep. of Germany

[21] Appl. No.: 943,616

[22] Filed: Sep. 19, 1978

[30] Foreign Application Priority Data

Sep. 20, 1977 [DE] Fed. Rep. of Germany ....... 2742166

[51] Int. Cl.² .............................................. B29C 1/00
[52] U.S. Cl. .................................... 425/451.9; 249/68
[58] Field of Search .............. 425/451.9, 595; 249/63, 249/64, 66, 67, 68, 205

[56] References Cited

U.S. PATENT DOCUMENTS

| | | | |
|---|---|---|---|
| 2,526,918 | 10/1950 | Wilberschied | 425/595 X |
| 2,984,176 | 5/1961 | Sommer et al. | 425/451.9 X |
| 3,004,291 | 10/1961 | Schad | 425/451.9 X |
| 3,174,181 | 3/1965 | Langecker | 249/67 X |
| 3,196,483 | 7/1965 | Eyles | 249/68 X |
| 3,199,159 | 8/1965 | Wernecke | 425/595 X |
| 3,323,173 | 6/1967 | Poyner | 425/451.9 X |
| 3,398,781 | 8/1968 | Bevis | 249/68 X |
| 3,724,802 | 4/1973 | Verneria | 249/67 |

Primary Examiner—J. Howard Flint, Jr.
Attorney, Agent, or Firm—Montague & Ross

[57] ABSTRACT

A latch for a mold having an inner mold part sandwiched between fixed and movable outer mold parts comprises a pair of bars each mounted on a respective one of outer mold parts and a locking pin mounted on the inner mold part but displaceable thereon in a direction perpendicular to the direction of motion of the mold parts during opening and closing. One of the bars is formed with a seat in which the pin is snugly engageable when the respective outer mold part is snugly engaged with the inner mold part, and the other outer mold part can only move against the inner mold part when this pin is seated in the recess as otherwise it blocks a control surface of the bar of the outer mold part. A bolt provided in the inner part is also slideable to block displacement of the other outer mold part toward the inner mold part until the one outer mold part is relatively closely juxtaposed with the inner mold part and a control surface of the respective bar cams the bolt out of the way of the other part.

10 Claims, 5 Drawing Figures

LATCH FOR THREE-PART MOLD

FIELD OF THE INVENTION

The present invention relates to a latch for a three-part mold. More particularly, this invention concerns such a latch which ensures opening and closing of a three-part mold in a predetermined sequence.

BACKGROUND OF THE INVENTION

A three-part mold used in pressure and injection molding normally has two outer parts that sandwich an inner part. One of the outer parts carries the core or plug of the mold and the other outer part along with the inner part together form the outside of the mold. For demolding an injected or blown article it is normally necessary first to pull the plug or plugs out of the mold, then to separate the other two parts of the mold. Similarly on closing it is normally desired to insert the plug part on the one outer mold part into the inner mold part only after mating of the inner mold parts with the outer mold part.

Accordingly it is known to provide a latch arrangement on a three-part mold to ensure such sequential opening and closing. Such a latch arrangement is described in German patent publication No. 1,215,876. This arrangement has a pair of bars extending toward each other and each mounted on the respective one of the outer plates. These bars are pivotal and can engage a pin fixed on the inner plate and surrounded by a displaceable control unit. Control and locking surfaces on the bars interact with each other and with the pin and control slide to ensure the desired sequential functioning both during opening and closing.

The disadvantage of this known system is that the mechanism is relatively complex and must undergo quite some displacement during operation. As a result operation of the latch mechanism is relatively noisy. Furthermore such a latch mechanism is subject to considerable wear and is relatively expensive to manufacture.

OBJECTS OF THE INVENTION

It is therefore an object of the present invention to provide an improved latch for a three-part mold.

Another object is to provide such a latch which is relatively simple, and hence inexpensive, yet which ensures the desired sequential opening and closing of the mold.

Another object is to provide such a latch which has few wear-prone and moving parts.

SUMMARY OF THE INVENTION

This object is attained according to the instant invention in a latch for a three-part mold of the above-described general type having a control bar which is rigid with one of the outer plates and extends longitudinally toward the other outer plate, a locking bar which is rigid with the other outer plate and which extends longitudinally toward one outer plate adjacent the control bar, a locking pin which is transversely movable but longitudinally fixed on the inner plate and engageable with both of the bars, and means including formations on the bars engageable with this pin for preventing relative longitudinal displacement of the other outer and inner parts during opening of the mold prior to separation beyond a predetermined spacing of the one outer and the inner parts. The formations include a transversely open seat in the locking bar and a locking face on the control bar which extends substantially parallel to the longitudinal displacement direction of the molded parts and which is engageable with the pin. This locking face is spaced transversely from the seat by a distance only permitting the locking face to pass the pin when the pin is fully lodged in the seat. Thus during displacement of the outer mold parts toward each other displacement of the one outer mold part toward the inner mold part will be inhibited during closing until the pin is seated in the locking bar of the other outer plate, which only occurs when the other outer plate flatly butts the inner plate.

This pin, therefore, according to the invention is the main moving part of the assembly, as the two bars are rigid with the respective outer plates. The pin is relatively small and is formed as a body of a revolution so that it can roll and rotate on the control surfaces of the two bars to reduce friction. As a result of its small mass the noise made by the latch during opening and closing will be minimal and, in fact, is normally imperceptible.

According to another feature of this invention a bolt arrangement is provided which is engageable with the control bar and which prevents the one outer plate and the inner plate from approaching each other beyond a predetermined relatively large spacing slightly larger than the above-mentioned spacing, and which only allows further displacement toward each of the one outer plate and the inner plate when the other outer plate and the inner plate are spaced apart by a relatively small spacing. This locking bar is flatly engageable in the displacement direction of the mold parts with a shoulder formed on the control bar immediately before the control surface on the control would engage the pin, so that an extremely effective and wear-free blocking of the control bar is possible. The locking bar is also engageable with this bolt to displace it out of the way of the control bar when the other outer plate and the inner plate are spaced apart by a relatively small spacing. Nonetheless even when the bolt is out of the way of the control bar, permitting the one outer plate and the inner plate to move slightly toward each other, further displacement of the one plate and the inner plate toward each other is still completely impossible until the pin is snugly seated in the seat of the locking bar.

SPECIFIC DESCRIPTION

Figure 1:
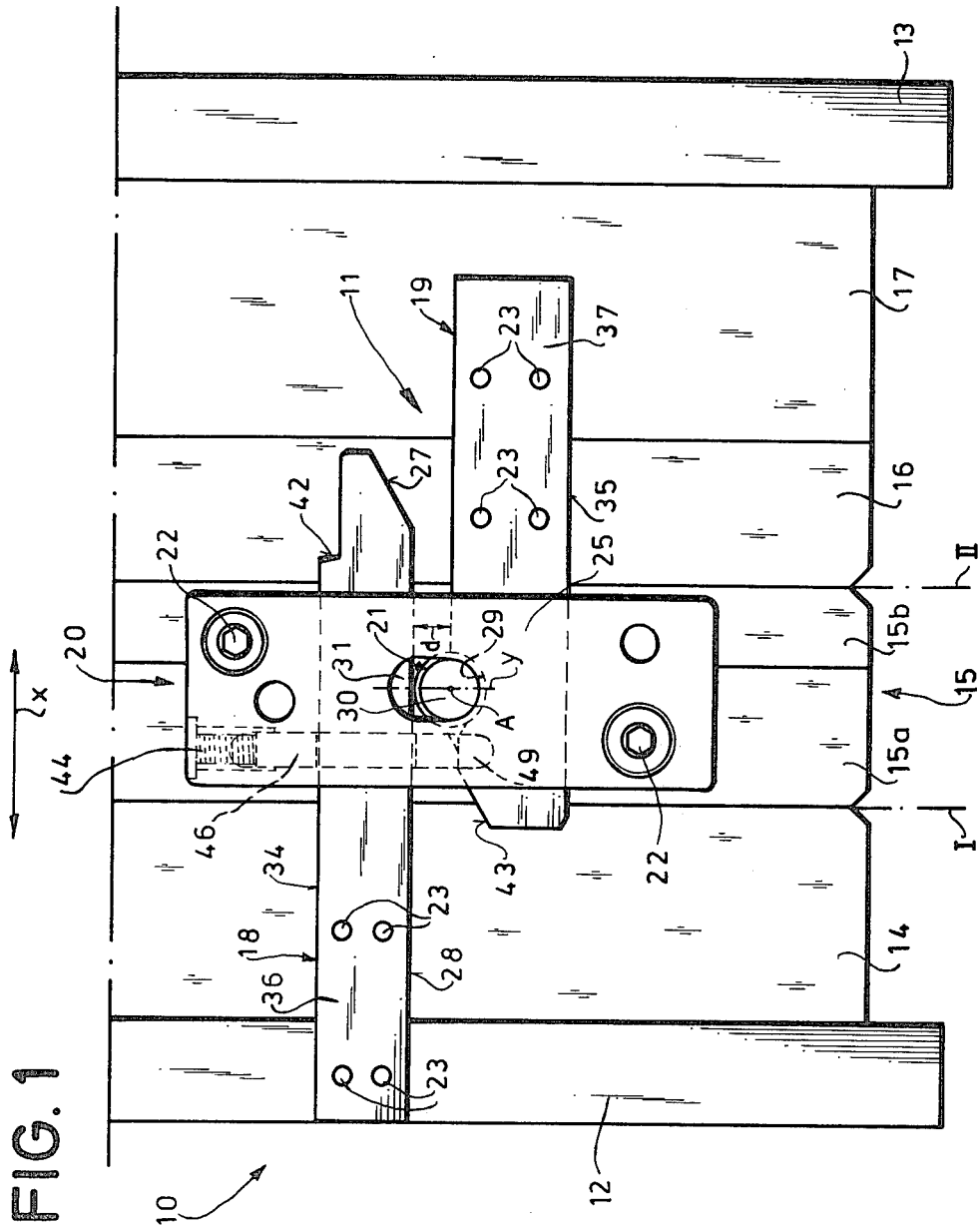
FIG. 1 is an elevational view of the latching arrangement according to this invention in the fully closed position.

As shown in FIG. 1 a three-part mold 10 is provided with a latch 11 constituted according to the invention. The mold 10 comprises a fixed outer plate 12 and a movable outer plate 13. Secured to the fixed plate 12 is a fixed outer mold part 14 and secured to the movable plate 13 a pair of movable parts 16 and 17 fixed together. Sandwiched between these outer mold parts 14 and 16 is an inner mold part 15 having two sections 15a and 15b bolted tightly together.

The latch arrangement basically comprises a control bar 10 rigidly fixed by machine screws 23 on the fixed mold part 14 and the plate 12, and a coupling or locking bar 19 similarly fixed by screws 23 on the outer mold part 16 and 17. Between these two bars 18 and 19 which extend longitudinally in the direction x of opening and closing of the mold is a coupling unit 20 secured by Allen screws 22 to the inner mold 15 and provided with a coupling pin 21 extending perpendicular to the plane of the bars 18 and 19 and engageable therewith. This pin 21 is not movable relative to the part 15 in the direction x, but is movable relative thereto in the direction y which extends perpendicular to the direction x.

The coupling unit 20 according to this invention basically comprises a rectangular cover plate 24 annd a U-section guide block 26. The free ends of the two bars 18 and 19 in the fully closed position of the mold shown in FIG. 1 lie between this plate 24 and a web 25 of the U-section guide block 26.

The control bar 19 has at its free end a 30°-inclined camming surface 27 which terminates at an edge surface 28 extending parallel to the direction x. The locking bar 19 is formed with a semicylindrical recess or seat 29 in which is engageable the enlarged cylindrical central portion of the pin 21 whose smaller diameter ends 30 are received in slots 31 formed in the web 25 and plate 24 and extending parallel to the direction y. The faces of the bars 18 and 19 turned away from the viewer in FIGS. 1-4 slide against a planar surface 32 of the plate 24, which surface is parallel to direction x. In addition the block 26 is formed with confronting edge surfaces 33 against which ride upper and lower edges 34 and 35 of the bars 18 and 19 respectively. The opposite side faces 36 and 37 of the bars 18 and 19 ride against the inner planar surface of the web 25.

The control unit is further provided with a U-shaped bolt 40 slidable in direction y and having a pair of legs 46 extending perpendicular to the direction x and y and connected together by a bight 48. The web 25 is formed with a groove 49 in which can slide the bight 48 and the block 26 has a recess 47 which receives the one leg 46 as well as coil compression spring 44 that biases the bolt 40 downwardly. The two legs 46 define a gap or hole 41 through which can pass the end of the bar 18, but a shoulder 42 on this bar 18 is flatly engageable with the upper leg 46 as will be described below. Furthermore the lower leg 46 is formed with an inclined actuating surface 45 engageable with the similarly inclined actuating surface 43 of the bolt 19. The surfaces 27 and 43 define between themselves in the positions of FIGS. 1-4 a space 39 containing the pin 21.

The mold according to this invention separates along two planes I and II respectively between the parts 14 and 15 between the parts 15 and 16. Tie rods or guide pins 38 are provided to ensure perfect longitudinal motion of the three parts 14, 15, and 16 relative to each other in the direction x. The mold 14–16 may be used for pressure or blow molding and must operate with opening along the plane I prior to opening along the plane II. In this manner the core is completely pulled out of the molded article before the article itself is demolded. Similarly when the mold closes it is essential that the two mold parts 15 and 16 are substantially closed before the mold parts 14 and 15 close.

The apparatus therefore functions as follows:

When fully closed as shown in FIG. 1 the parts 14, 15 and 16 abut at the planes I and II. The bar 18 extends all the way through the unit 20 and through the hole 41 in the bolt 40, with the lower surface 28 just touching the uppermost part of the central portion of the pin 21. The bar 19 similarly extends through the unit 20 and the central portion of the pin 21 is firmly seated in the recess 29. Similarly the lower edge of upper leg of 46 and/or the lower edge of the lower leg 46 rest on the top edges of the bars 18 and 19.

Figure 2:
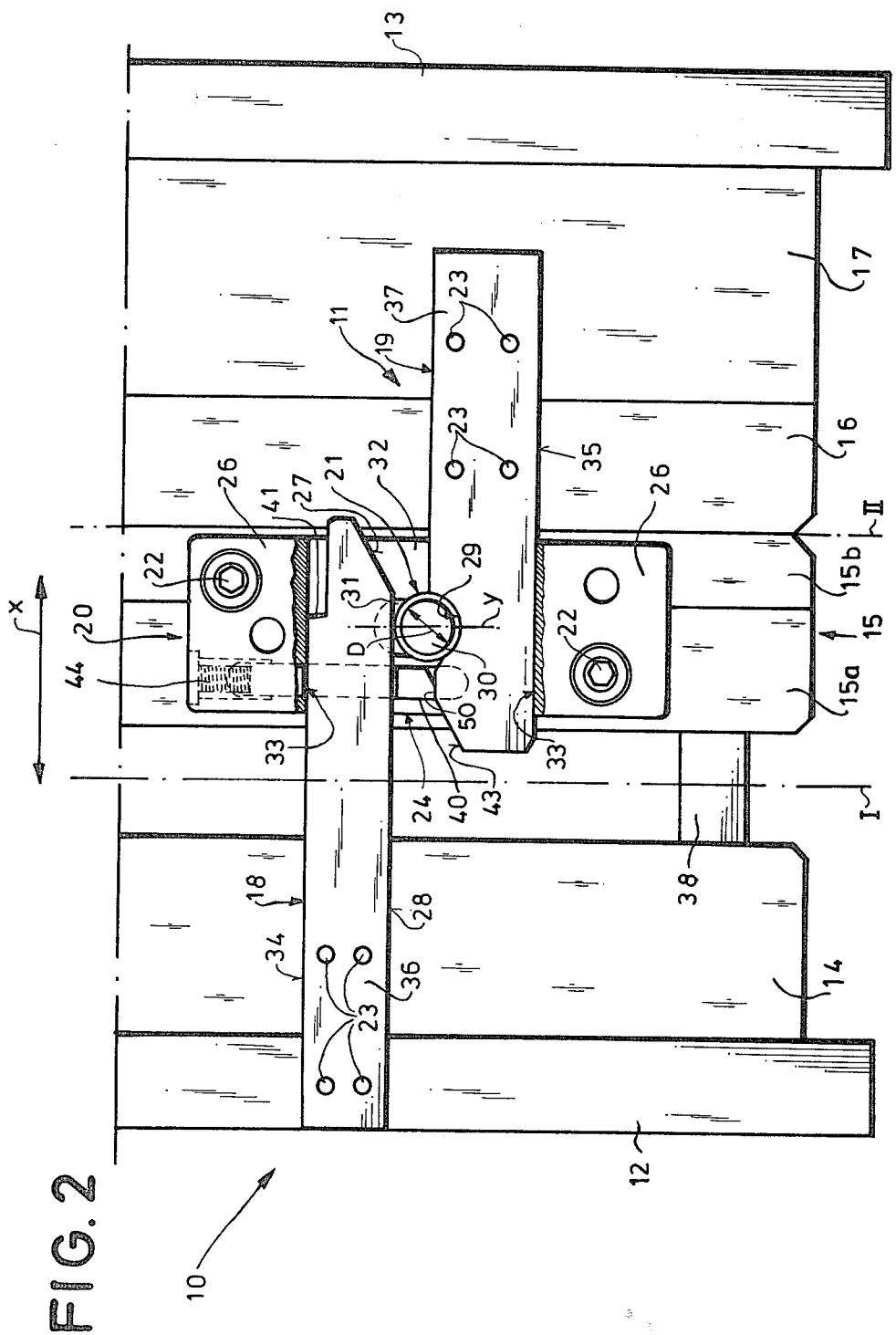
FIGS. 2–4 are partly broken away elevational views showing the latching arrangement of FIG. 1 in successive positions as it opens.

As the mold starts to open as shown in FIG. 2 by exertion of oppositely outwardly effective forces in the direction x on the plates 12, 13 the part 14 will pull away from the part 15, separating at the plane I. Thus the bar 18 will slide out of the unit 10 and out of the hole 41. Separation at the plane II will be impossible because the pin 21, which is firmly lodged in the seat 29, will be held firmly in this seat 29 because the upper portion of this pin 21 will be bearing upwardly against the lower edge of the bar 18.

Figure 3:
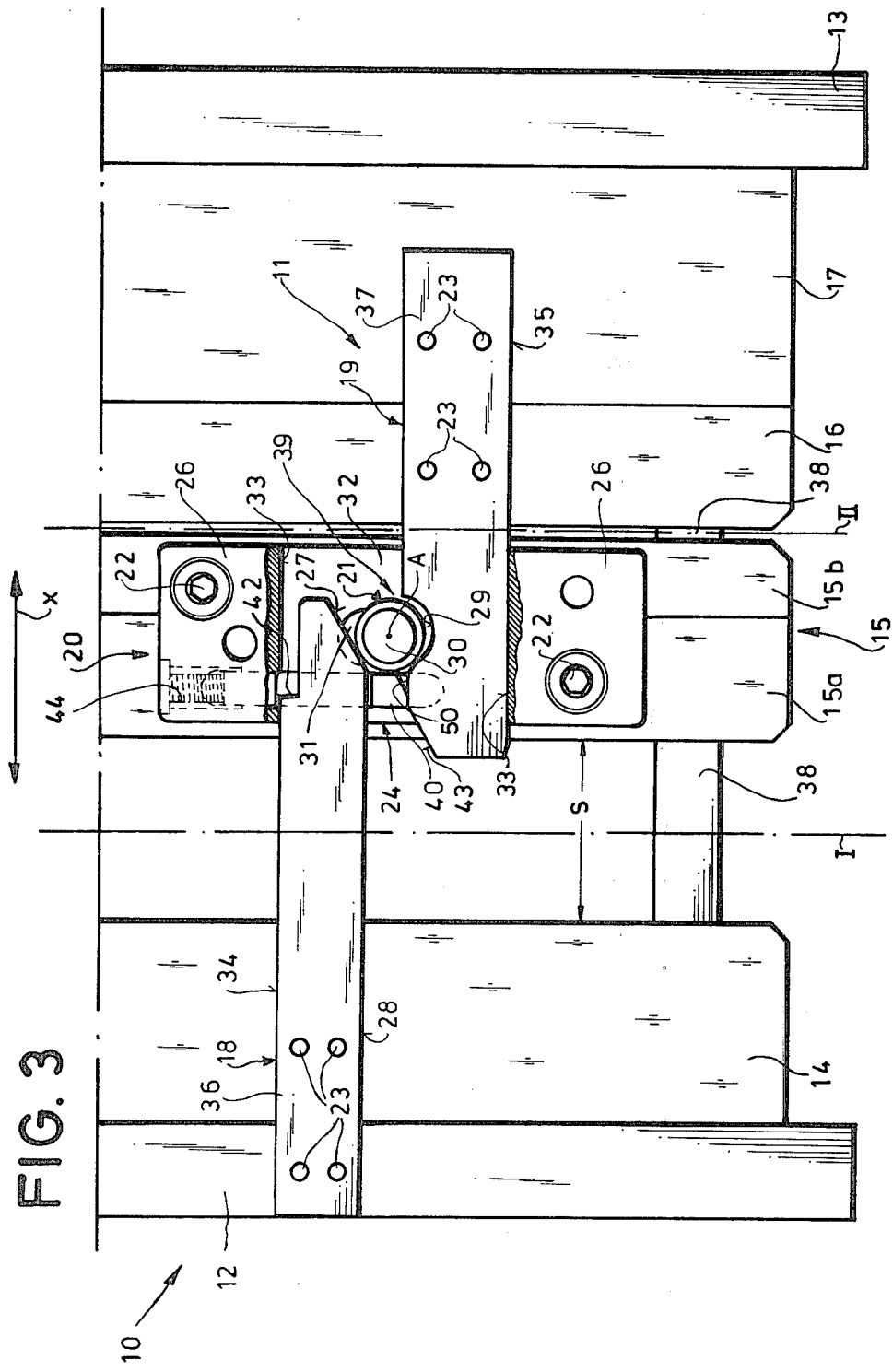

Only when the bar 18 reaches the position shown in FIG. 3 can the pin 21 rise up out of the seat 29 to make a separation along the plane II possible. Thus only after a predetermined spacing S is created between the two mold parts 14 and 15 can the mold parts 15 and 16 separate.

Figure 4:
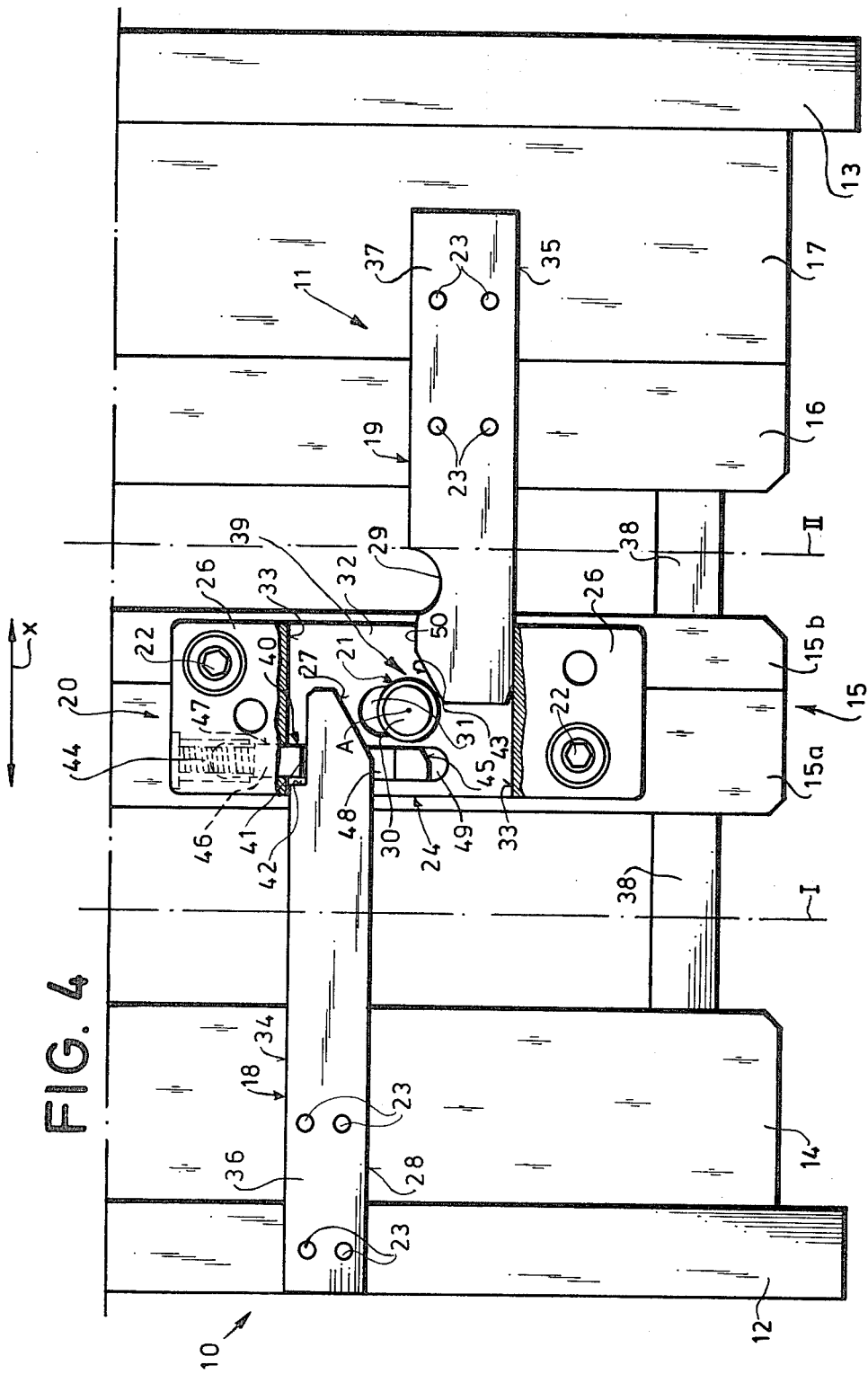
Figure 5:
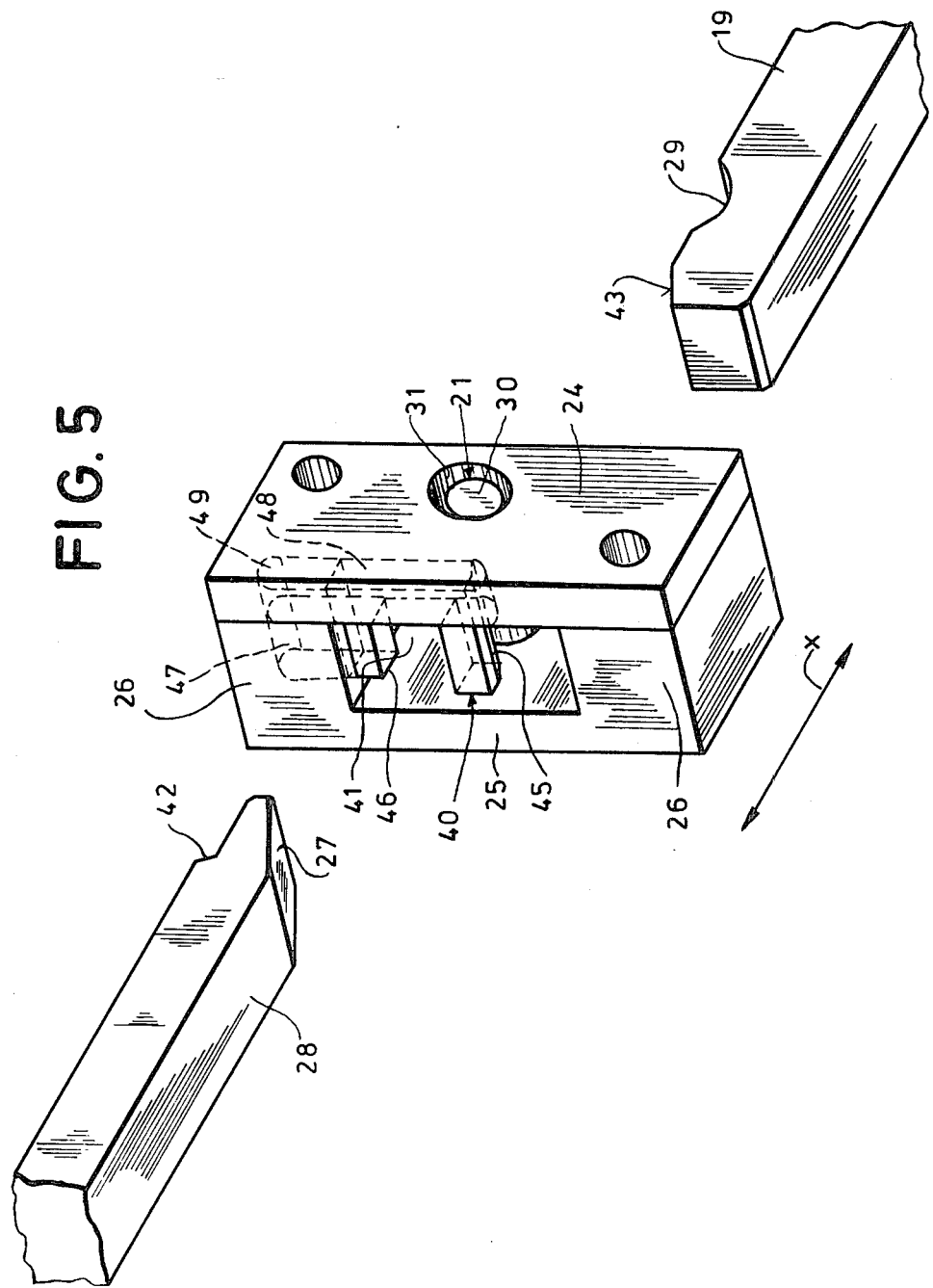
FIG. 5 is a perspective view of the latching arrangement according to this invention.

Subsequent separation as shown in FIG. 4 will allow the pin 21 to ride back over the surface 50 down the surface 43, while the bolt 40 will drop gravitationally and/or be urged downwardly by the spring 44 once it clears the shoulder 42 of the bar 18. Although a much wider separation of the mold parts 14–16 relative to each other is still possible, no further changes in the mechanism of the latch 11 take place on separation beyond the position of FIG. 4. In this position with separation at the planes I and II as shown in FIG. 4 that part 15 effectively is floating in the direction x between the two parts 14 and 16.

On closing of the mold by displacement of the part 16 towards the fixed part 14 the bar 19 will first enter the passage through the unit 20 and one of two things will happen. The bar 19 will simply move completely through the unit 20, camming up the pin 30 with the surface 43 and subsequently camming up the bolt 40 by engagement of the surfaces 43 and 45 together until the mold parts 15 and 16 abut each other. Further displacement of the part 16 toward the part 14 will simply push the part 15 toward the part 14.

Alternately it frequently occurs that as the bar 19 engages in the unit 20 it will push the part 15 toward part 14. For the same reasons that the mold should be opened by first splitting along the plane I and then splitting along the plane II, during closing the mold should first close substantially at the plane II before closing at the plane I. Thus according to the invention if the bar 19 engages in the passage of the unit 20 and, instead of merely threading through it, pushes part 15 toward the part 14 it will bring the upper leg 46 of the bolt 40 flatly into engagement with the shoulder 42 of the bar 18. On such engagement further displacement of the parts 14 and 15 is rigidly and effectively blocked. Further displacement of the part 16 toward the part 14 will, however, first have the effect of camming the roller 21 up with the surface 43 until the middle portion of this roller rides past the inclined surface 43 up on the upper surface 50 between the seat 29 and the surface 43.

Thereafter as shown in FIG. 3 the inclined surface 43 will engage the inclined surface 45 of the bolt 40 and will cam it upwardly, so that the upper leg 46 will clear the shoulder 42 and will allow the two parts 14 and 15 to move slightly toward each other until the surface 27 engages the pin 21.

Further displacement of the parts 14 and 15 toward each other is, however, impossible until the pin 21 drops down into the seat 29 so that this pin 21 lies at its highest point below or at the level of the lower edge 28 of the bar 18. Only in this position as shown in FIG. 2 can the bar 18 slide through the unit 20 until the mold is again closed as shown in FIG. 1.

Thus with the mold according to the instant invention during opening displacement of the mold part 16 away from the mold part 14 will always cause the mold open only at the plane I until the spacing S is created. Once this spacing S is created the mold will start to separate at the plane II between the parts 15 and 16 until the mold is completely open. Conversely when the mold closes the arrangement of the bolt 40 with its interacting surfaces and of the pin 21 prevent the two parts 14 and 15 from coming closer to each other by a distance smaller than the spacing S until the two parts 15 and 16 abut flatly against each other at the plane II. In this manner a synchronous and solidly mechanically controlled opening and closing of the three-part mold is ensured at all times.

The above-described operation takes place with a minimal noise and wear to the parts of the machine. In fact the only wear-prone parts are the two bars 18 and 19 and the pin 21, which are all made according to this invention at least at their engaging surfaces of hardened steel. What is more the pin 21 is rotatable about its axis A perpendicular to the directions x and y so that wear is further reduced.

I claim:

1. A latch for a mold having an inner mold part sandwiched between a pair of the outer mold parts, said parts being relatively displaceable in a longitudinal direction, said arrangement comprising:

a control bar rigid with one of said outer parts and extending longitudinally toward the other outer part;

a locking bar rigid with said other outer part and extending longitudinally toward said one outer part adjacent said control bar;

a locking pin transversely movable but longitudinally fixed on said inner part and engageable with both of said bars; and means including formations on said bars engageable with said pin for preventing relative longitudinal displacement of said other and inner parts during opening of said mold prior to separation beyond a predetermined spacing of said one and inner parts.

2. The latch defined in claim 1 wherein said formations include a transversely open seat in said locking bar in which said pin in snugly engageable when said other and inner parts abut each other longitudinally.

3. The latch defined in claim 1 wherein said formations including a locking face on said control bar extending substantially parallel to said longitudinal direction and engageable with said pin, said locking face being spaced transversely from said seat by a distance only permitting said locking face to pass said pin when same is fully lodged in said seat.

4. The latch defined in claim 3 wherein said pin has a substantially cylindrical portion engageable in said seat and with said locking face and of predetermined diameter, said seat having a lower portion spaced in a direction perpendicular to said pin and to said displacement direction by a distance substantially equal to said seat.

5. The latch defined in claim 1, further comprising means including a transversely slidable bolt longitudinally fixed in said inner part for preventing said one and inner parts from approaching each other beyond another predetermined relatively large spacing on closing of said mold prior to juxtaposition of said other and inner parts at a predetermined relatively small spacing.

6. The latch defined in claim 5 wherein said means includes a formation on said control bar flatly engageable in said direction with said bolt at said predetermined large spacing, and a formation on said locking bar cammingly engageable with said bolt at said relatively small spacing for displacing same out of the way of said formation on said control bar.

7. The latch defined in claim 1 wherein said means includes a guide block fixed on said inner part and having at least one slot extending perpendicular to the longitudinal displacement direction and receiving said pin.

8. The latch defined in claim 7 wherein said pin is generally cylindrical and rotatable about an axis substantially perpendicular to said direction.

9. The latch defined in claim 8 wherein said formations include a camming surface on said longitudinal bar inclined to said direction and engageable with said pin to displace same perpendicular to said direction, and inclined camming surface on said control bar engageable in said direction with said pin when same engaging said locking bar at a location other than at said seat.

10. The latch defined in claim 7 wherein said pin is stepped and has a large-diameter portion engageable with said surfaces and a small-diameter portion in said slot.

* * * * *